United States Patent [19]
Yoshida et al.

[11] Patent Number: 5,894,543
[45] Date of Patent: Apr. 13, 1999

[54] FACSIMILE APPARATUS HAVING TWO STATES OF OPERATION WHICH ARE CONTROLLED IN RESPONSE TO DISCRIMINATING AN OPERATIONAL CONDITION

[75] Inventors: Takehiro Yoshida, Tokyo; Motoaki Yoshino, Fujisawa, both of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/546,038

[22] Filed: Oct. 20, 1995

[30] Foreign Application Priority Data

Oct. 20, 1994 [JP] Japan ................... 6-255244

[51] Int. Cl.⁶ ................... H04N 1/00; H04N 1/32
[52] U.S. Cl. ................... 395/113; 358/437; 358/468
[58] Field of Search ................... 358/400, 468, 358/300; 395/113, 750.03, 750.05, 750.06, 112; 399/70; 364/707; 340/309.15

[56] References Cited

U.S. PATENT DOCUMENTS

| | | | |
|---|---|---|---|
| 5,177,620 | 1/1993 | Fukushima | 358/468 |
| 5,321,478 | 6/1994 | Nakamura et al. | 399/70 |
| 5,325,209 | 6/1994 | Manabe | 358/437 |
| 5,410,419 | 4/1995 | Muramatsu et al. | 358/468 |
| 5,504,907 | 4/1996 | Stewart et al. | 364/707 |
| 5,508,824 | 4/1996 | Baba | 358/468 |
| 5,550,637 | 8/1996 | Murakami | 358/296 |
| 5,652,950 | 7/1997 | Kim | 399/70 |
| 5,729,667 | 3/1998 | Lee | 395/113 |
| 5,758,040 | 5/1998 | Ichimura et al. | 395/113 |

*Primary Examiner*—Scott Rogers
*Attorney, Agent, or Firm*—Fitzpatrick Cella Harper & Scinto

[57] ABSTRACT

A facsimile apparatus has an AC power source and a standby power source which are selectively changed. The number of times of changing the power sources is minimized to limit deterioration of the AC power source. When the frequency of use of the facsimile apparatus is high, the AC power source is maintained in the on state.

32 Claims, 11 Drawing Sheets

FIG. 9
| FIG. 9A |
| FIG. 9B |
FIG. 9B
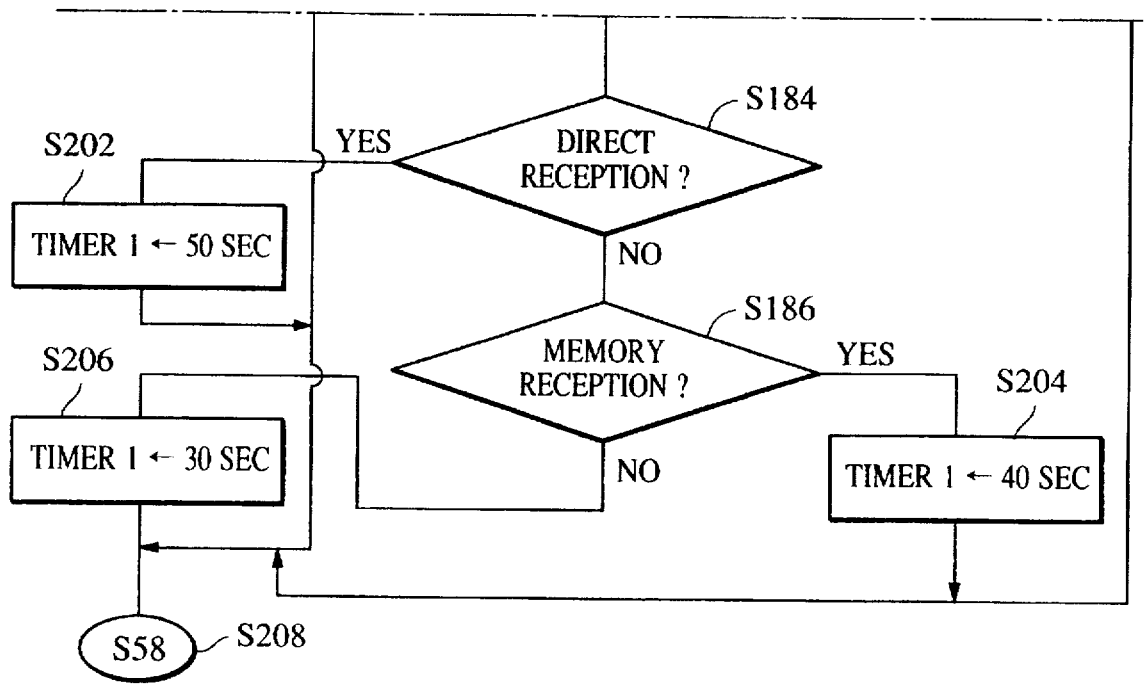
FIG. 10
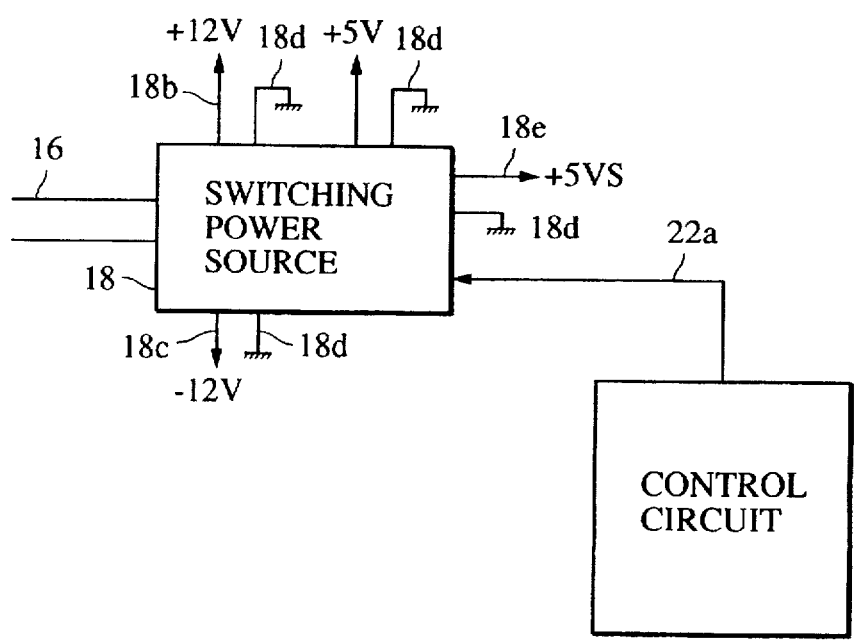

FACSIMILE APPARATUS HAVING TWO STATES OF OPERATION WHICH ARE CONTROLLED IN RESPONSE TO DISCRIMINATING AN OPERATIONAL CONDITION

BACKGROUND OF THE INVENTION

1. Field of the Invention

The present invention relates to facsimile apparatuses and, more particularly, to a facsimile apparatus having an energy saving function in a standby state.

2. Description of the Related Art

A kind of facsimile apparatus is known which is in an energy saving state when on standby, and which performs various operations by setting an AC power source in an input-enabled state when each operation is selected. A method for changing such a facsimile apparatus between a standby state and an operating state has been proposed in which oscillation of a switching power source is stopped when the apparatus is in the standby state and is started to output a DC voltage on the secondary side when an operation is selected, and in which, when the operation is finished, oscillation of the switching power source is immediately stopped and the apparatus is again set the standby state.

In some case, however, the next operation is performed successively after the completion of the preceding operation. If oscillation of the switching power source is immediately stopped in such a case, the number of stops and starts of oscillation of the switching power source is increased, so that the life of the switching power source is shortened.

SUMMARY OF THE INVENTION

In view of the above-described problem, an object of the present invention is to provide an improved facsimile apparatus which has a high-power-consumption operating mode and a low-power-consumption operating mode, and in which the period of time between the moment when processing in the operating mode is finished to the moment when the apparatus is thereafter set in the standby mode is changed to prevent a reduction in the life of the apparatus while the power consumption is reduced.

BRIEF DESCRIPTION OF THE DRAWINGS

FIGS. 9A and 9B are flowcharts of control of control circuit 22 shown in FIGS. 1 and 5;

FIG. 10 is a block diagram of still another embodiment of the facsimile apparatus of the present invention;

DESCRIPTION OF THE PREFERRED EMBODIMENTS

The present invention will be described in detail with respect to preferred embodiments thereof with reference to the accompanying drawings.

(First Embodiment)

Figure 1:
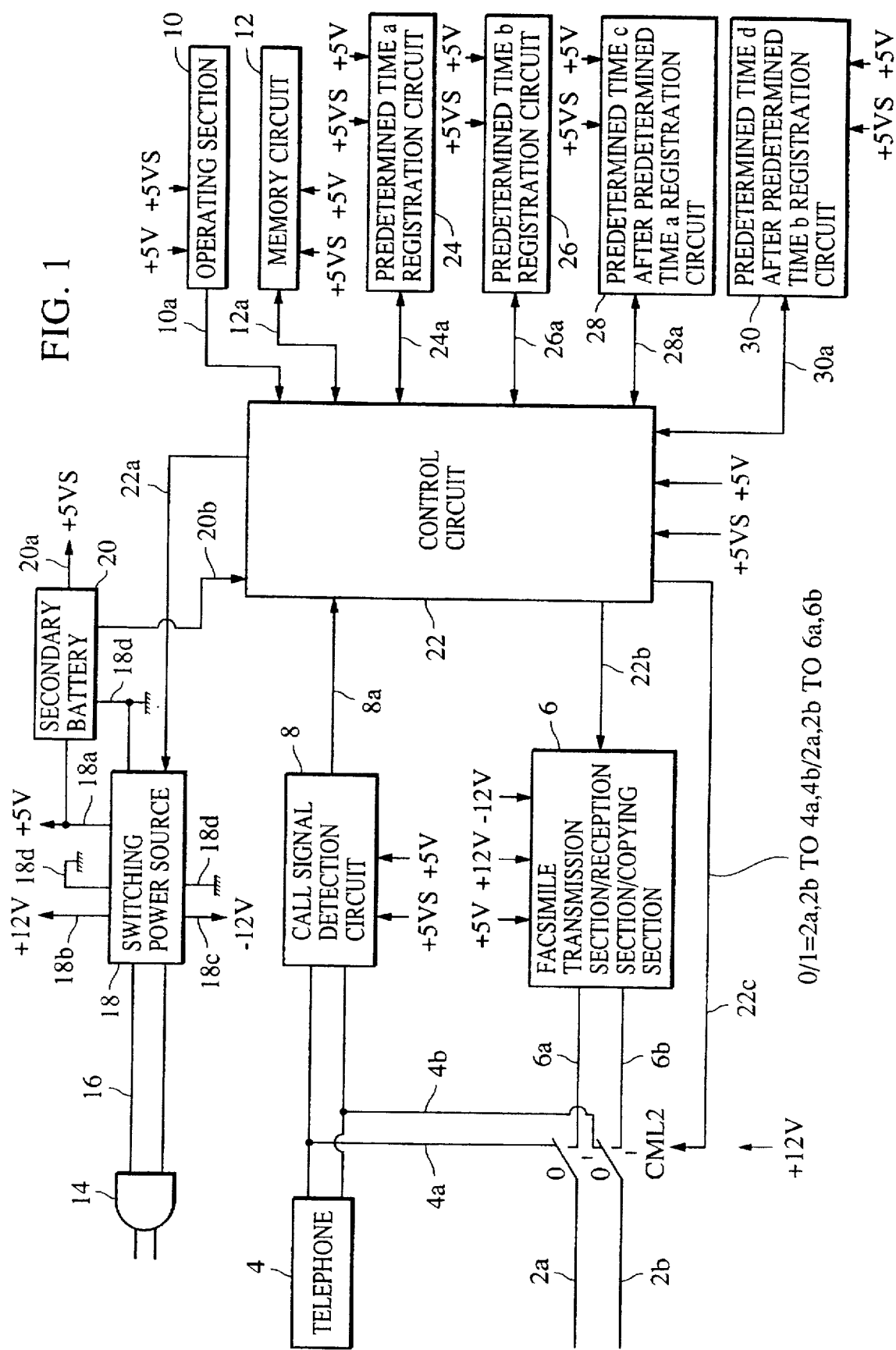
FIG. 1 is a block diagram of an embodiment of a facsimile apparatus in accordance with the present invention.

Referring to FIG. 1 which is a block diagram of a facsimile apparatus in accordance with the present invention, a relay CML2 changes between a position for connecting telephone circuit wires 2a and 2b to signal wires 4a and 4b extending from a telephone 4 and a position for connecting the wires 2a and 2b to signal wires 6a and 6b extending from a facsimile communication section 6. When a signal having a signal level "1" is output to a signal line 22c, the relay CML2 is turned on, that is, the telephone circuit wires 2a and 2b are connected to the signal wires 6a and 6b from the facsimile communication section. When a signal having a signal level "0" is output to the signal line 22c, the relay CML2 is turned off, that is, the telephone circuit wires 2a and 2b are connected to the signal wires 4a and 4b from the telephone. A voltage of +12 V is supplied to the relay CML2, and the relay CML is driven the energy of a current thereby caused. When the relay CML is not supplied with +12 V, it is off.

A block 6 represents the facsimile communication section, consisting of a facsimile communication section, a facsimile reception section and a copying section. Voltages of +5 V, +12 V and −12 V are supplied to this block. According to the supply of these voltages, memory transmission, direct transmission, multiple address transmission, copying, direct reception or memory reception is executed under control through a signal line 22b. Information transmitted at the time of timer memory transmission and information received at the time of memory reception are stored in a memory circuit 12 which can operate (store information) by +5 V S (5 V standby).

A block 8 represents a call signal detection circuit which detects a tonal signal of 16 Hz, 25 Hz, 50 Hz or 1300 Hz output to the signal wires 4a and 4b. The call signal detection circuit 8 outputs a signal having signal level "1" to a signal line 8a if it determines that a call signal has been detected, and outputs a signal having signal level "0" to the signal line 8a if it determines that no call signal has been detected. The call signal detection circuit 8 can operate by 5 V S, and operates by 5 V without being supplied with 5 V S when a switching power source 18 is oscillating. It is important that detection of a call signal is made by 5 V S (i.e., a voltage of 5 V charged in a secondary battery 20 when the switching power source 18 is not oscillating).

A block 10 represents an operating unit having various keys including a direct transmission key, a memory reception setting key, a copying key, a one-touch dial key, a ten key cluster, a start key, a setting key, registration keys for registering predetermined times a and b and other registration keys for registering predetermined time periods c and d. Information input by depressing one of these keys is output to a signal line 10a. The operating section 10 can also operate by the output from secondary battery, i.e., +5 V S even when the switching power source is not oscillating, as in the case of the call signal detection circuit 8. When the switching power source 18 is oscillating, the operating section 10 is supplied with +5 V and does not use energy of +5 V S.

Information stored in the memory circuit 12 can be read out through a signal line 12a. Also, information can be written in the memory circuit 12 through the signal line 12a. The memory circuit 12 can also operate by the secondary battery output, i.e., +5 V S when the switching power source is not oscillating, and is supplied with +5 V and does not use energy of +5 V S when the switching power source 18 is oscillating.

A block 24 represents a circuit for registering a predetermined time a. Information can be written in or read out from the circuit 24 through a signal line 24a.

A block 26 represents a circuit for registering a predetermined time b. Information can be written in or read out from the circuit 26 through a signal line 26a.

A block 28 represents a circuit for registering a predetermined time period c which is set in a certain period after the predetermined time a as a length of time from the completion of one operation to a change from a state B to a state A. Information can be written in or read out from the circuit 28 through a signal line 28a.

A block 30 represents a circuit for registering a predetermined time period d which is set in a certain period after the predetermined time b as a length of time from the completion of one operation to a change from state B to state A. Information can be written in or read out from the circuit 30 through a signal line 30a.

Each of the registration circuits 24, 26, 28, and 30 can operate by the secondary battery output, i.e., +5 V S even when the switching power source is not oscillating, as in the case of the memory circuit 12. When the switching power source 18 is oscillating, the each registration circuit is supplied with +5 V and does not use energy of +5 V S.

The apparatus has an AC plug 14 and an AC cable 16.

The switching power source 18 oscillates to output +5 V, +12 V and −12 V between signal lines 18a and 18b, between signal lines 18b and 18d and between signal lines 18c and 18d, respectively, when a signal having level "1" is output to a signal line 22a. When a signal having level "0" is output to the signal line 22a, the switching power source 18 does not oscillate and does not output the voltages of +5 V, +12 V and −12 V. When the voltage of +5 V is output, the secondary battery 20 is charged and has a charged voltage output as +5 V S. That is, +5 V S (+5 V standby) is output even when the switching power source 18 is not oscillating. When the facsimile apparatus is in a standby state, detection of a call signal and detection of the selection of one of various operations are made by +5 V S output from the secondary battery. The amount of charge in the secondary battery is output to a signal line 20b. When the amount of charge becomes smaller than a certain value, the switching power source 18 is turned on and maintained in the on (oscillating) state for, for example, 20 sec to charge the secondary battery to +5 V S by +5 V.

A block 22 represents a control circuit which mainly performs control as described below. The control circuit 22 has state A of using a smaller amount of AC power (in which it monitors conditions for staring one of the various operations by energy of 5 V S accumulated in the secondary battery, in which it inhibits the switching power source from oscillating and outputting +5 V, +12 V and −12 V) and another state B of using AC power according to need (in which it makes the switching power source 18 oscillate to output +5 V, +12 V and −12 V, in which it makes the 5 V system use +5 V without using energy of +5 V S, and in which it charges the secondary battery from +5 V). The control circuit 22 is ordinarily in state A. When a call signal is detected or one of the keys is pressed or at the time of timer operation, the control circuit 22 changes from state A into state B to execute an operation according to a starting factor. When a predetermined time elapses after the completion of the operation, the control circuit 22 changes from state B to state A. The control circuit 22 has a means for registering the predetermined times a and b and a means for registering the predetermined time period c after the predetermined time a and the predetermined time period d after the predetermined time b. When the operation according to a starting factor is completed, the control circuit 22 detects the present time and determines, on the basis of this time, a predetermined time period to a change from state B to state A. The control circuit 22 also checks the amount of charge in the secondary battery (charge of +5 V S). If this amount of charge becomes equal to or smaller than a predetermined value, the control circuit 22 turns on the switching power source 18, maintains the same in the on (oscillating) state for 20 minutes and charges the secondary battery to +5 V S from +5 V.

Figure 2:
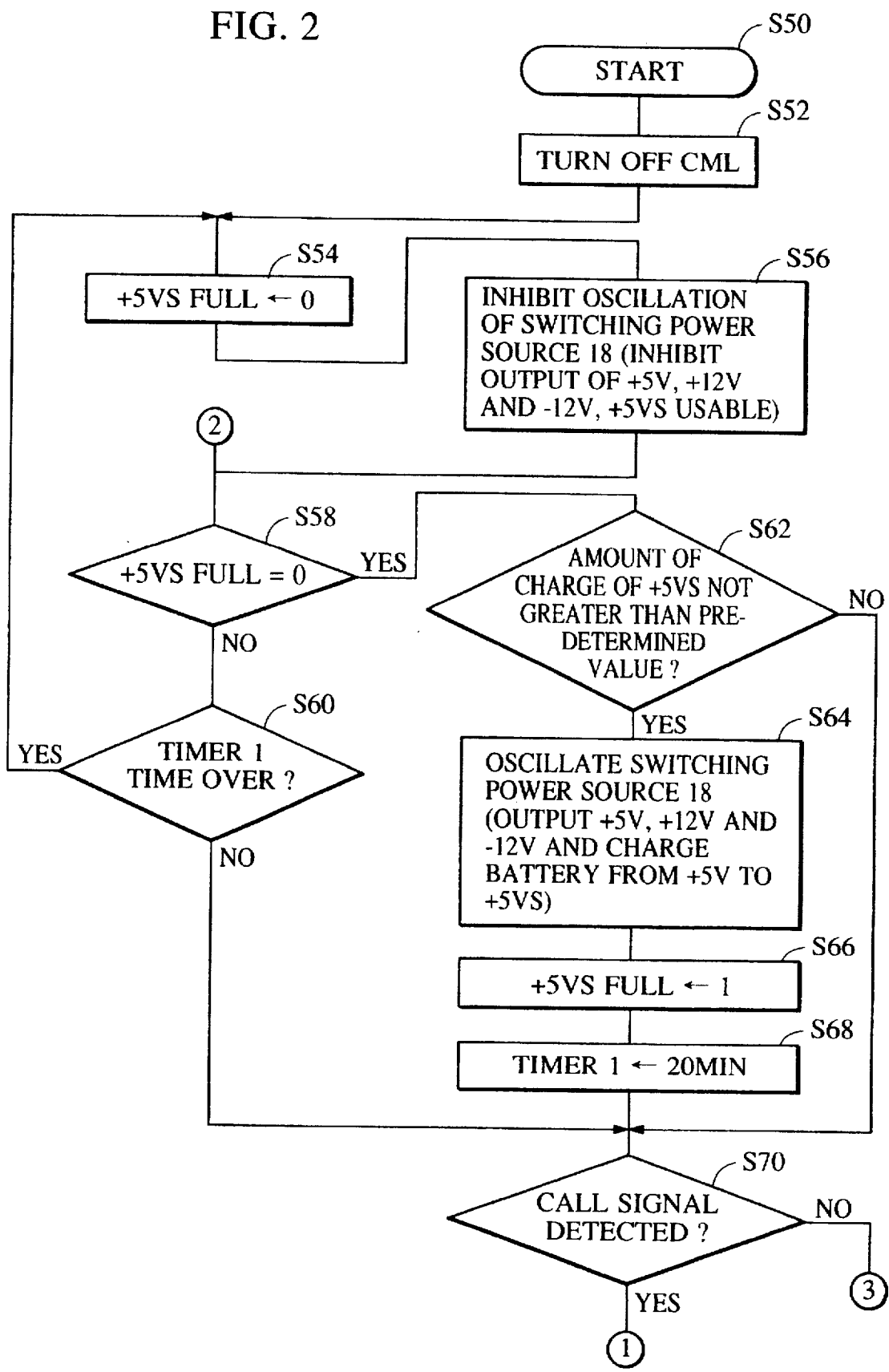
FIG. 2 is a flowchart of control of control circuit 22 shown in FIG. 1.
Figure 3:
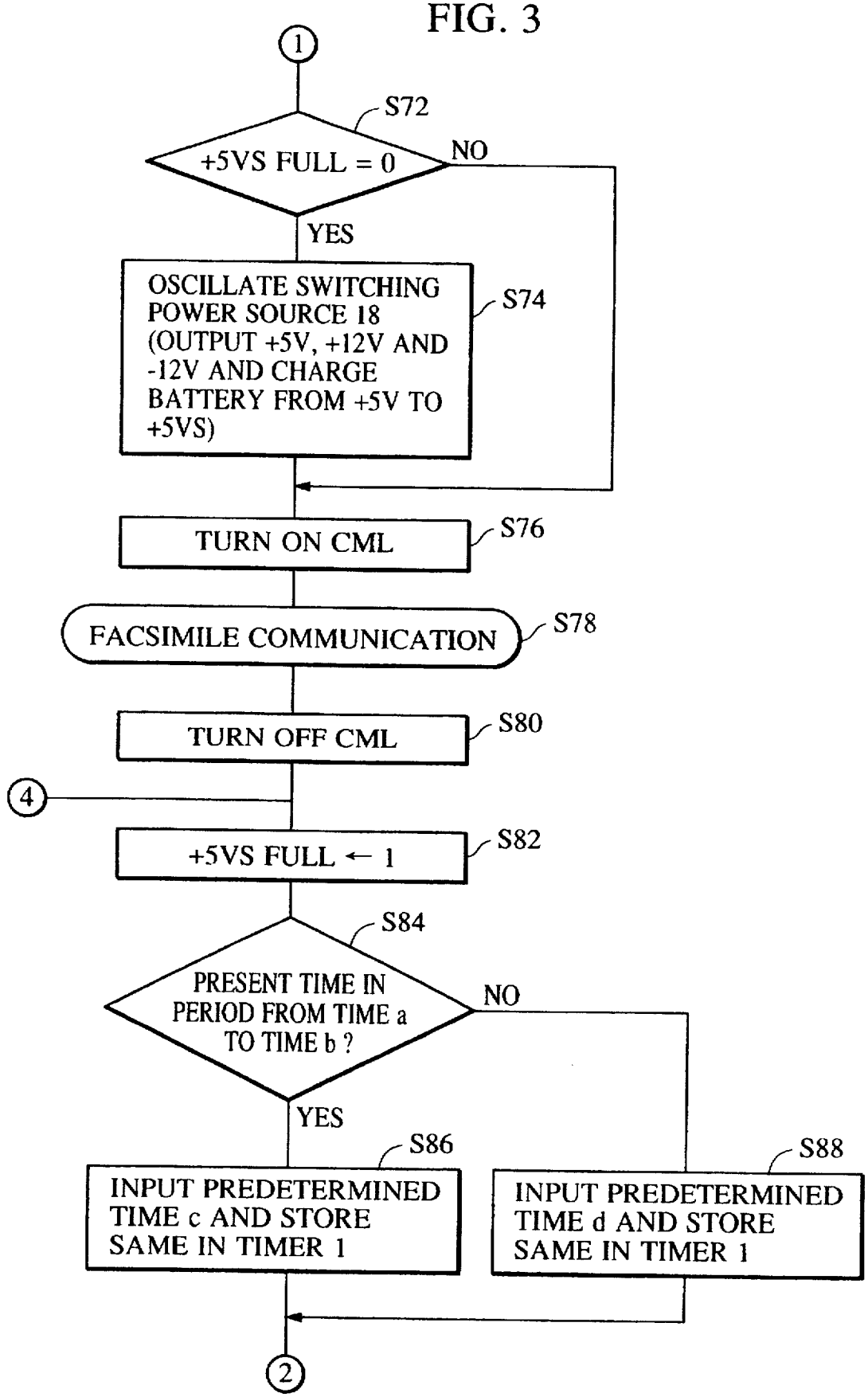
FIG. 3 is a flowchart of control of control circuit 22 shown in FIG. 1.
Figure 4:
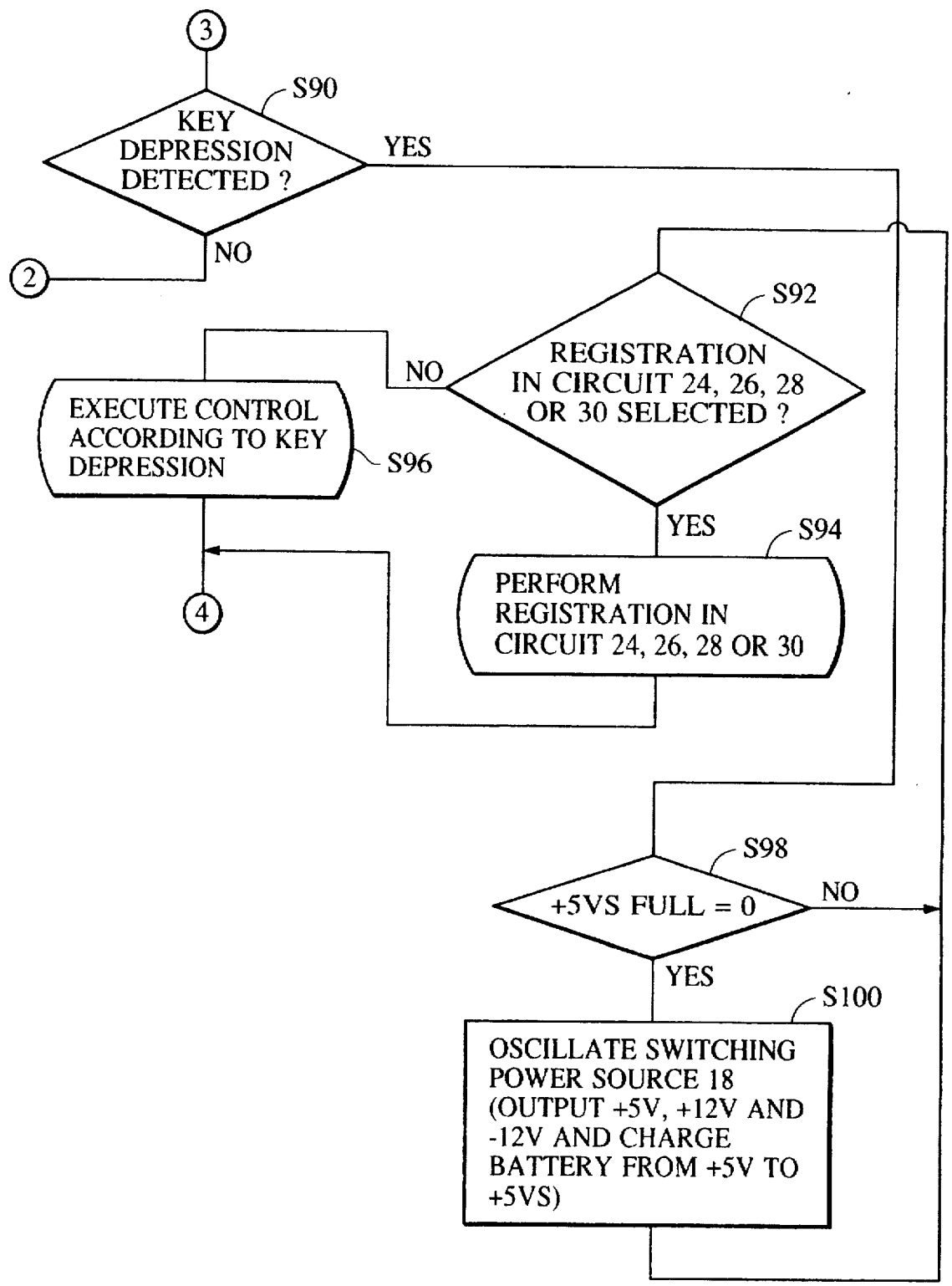
FIG. 4 is a flowchart of control of control circuit 22 shown in FIG. 1.

FIGS. 2, 3, and 4 are flow charts of a control process of the control circuit 22.

Referring to FIG. 2, the process starts in step S50.

In step S52, the signal at level "0" is output to the signal line 22c to turn off the relay CML.

In step S54, a flag +5 V FULL for indicating that the secondary battery 20 is being charged is set to 0. The flag is set to 0 when the battery is not being charged. The flag is set to 1 when the battery is being charged.

In step S56, the signal at level "1" is output to the signal line 22a to inhibit the switching power source 18 from oscillating. That is, +5 V, +12 V and −12 V are not output. At this time, +5 V S, output from the secondary battery, can be used.

In step S58, determination is made as to whether the flag +5 V S FULL is 0. If the flag +5 V S FULL is 0, that is, the battery is not being charged, the process proceeds to step S62. If the flag +5 V S FULL is 1, that is, the battery is being charged, the process advances to step S60 to make determination as to whether timer 1 has counted over a set time. When timer 1 counts over the set time, the process proceeds to step S54 to clear the flag +5 V S FULL, and oscillation of the switching power source 18 is stopped in step S56. If timer 1 has not counted over the set time, the process proceeds to step S70. Time setting of timer 1 is performed in steps S68, S86 and S88. In the case where step S68 is performed, the amount of charge in the secondary battery is insufficient and the battery is largely charged. Processing in steps S86 and S88 is timer setting for waiting through a predetermined time period for a change from state B to state A after the completion of an operation and for checking whether another operation is performed successively.

In step S62, information on signal line 20b is input and determination is made as to whether the amount of charge of 5 V S in the secondary battery is equal to or smaller than a predetermined value. If the amount of charge is equal to or smaller than the predetermined value, the process advances to step S64 to charge the secondary battery. If the amount of charge is larger than the predetermined value, the process proceeds to step S70.

In step S64, the signal at level "1" is output to the signal line 22a to make the switching power source 18 oscillate and output +5 V, +12 V and −12 V, and the secondary battery is charged to +5 V S from +5 V.

In step S66, the secondary battery is being charged to +5 V S and the flag +5 V S FULL is therefore set to 1.

In step S68, a charging time of 20 minutes is set in timer 1.

In step S70, the signal on signal line 8a is input and determination is made as to whether a call signal has been detected. If a call signal has been detected, the process advances to step S72. If no call signal has been detected, the process proceeds to step S90.

In step S72, determination is made as to whether the flag +5 V S FULL is 0, that is, whether the secondary battery is not being charged to +5 V S. If the flag +5 V S FULL is 0, that is, the secondary battery is not being charged to +5 V S, the signal at level "1" is output to signal line 22a in step S74 to make the switching power source 18 oscillate to output +5 V, +12 V and −12 V, and the secondary battery is charged to +5 V S from +5 V. If the flag +5 V S FULL is 1, that is, the secondary battery is being charged to +5 V S, the process proceeds to step S76 since the switching power source has been made to oscillate.

In step S76, the signal at level "1" is output to signal line 22c to turn on the relay CML. After facsimile communication has been performed (step S78), the signal at level "0" is output to signal line 22c to turn off the relay CML.

In step S82, checking is performed in state B for a predetermined time period as to whether another operation is performed subsequently, and processing is therefore performed so that the secondary battery is charged for the predetermined time period to 5 V S.

In steps S84, S86 and S88, the present time is detected and the time period c registered in the circuit 28 is input as a time period for checking in state B as to whether another operation is performed subsequently if the present time is in the period from time a to time b. The time period c is set in timer 1, and checking is made through the time period set in timer 1 as to whether another operation is performed subsequently. If some operation is performed subsequently, processing according to this operation is performed. If no operation is performed, a change to state A is made after the elapse of the time set in timer 1. If the present time is in the period from time b to time a, the time period d registered in the circuit 30 is input as a time period for checking in state B as to whether another operation is performed subsequently. The time period d is set in timer 1, and checking is made through the time period set in timer 1 as to whether another operation is performed subsequently. If some operation is performed subsequently, processing according to this operation is performed. If no operation is performed, a change to state A is made after the elapse of the time set in timer 1.

In step S90, information on signal line 10a is input and determination is made as to whether any one of the keys has been pressed. If some key has been pressed, the process proceeds to step S98 and determination is made as to whether the flag +5 V S FULL is 0, that is, whether the secondary battery is not being charged to +5 V S. If the flag +5 V S FULL is 0, that is, the secondary battery is not being charged to +5 V S, the signal at level "1" is output to signal line 22a in step S100 to make the switching power source 18 oscillate to output +5 V, +12 V and −12 V, and the secondary battery is charged to +5 V S from +5 V. If the flag +5 V S FULL is 1, that is, the secondary battery is being charged to +5 V S, the process proceeds to step S92 since the switching power source has been made to oscillate.

In step S92, determination is made as to whether registration in the circuit 24, 26, 28 or 30 has been selected. If such registration has been selected, the process advances to step S94 and a desired value is registered in the circuit 24, 26, 28 or 30. If no registration has been selected, the process proceeds to step S96 to execute a control based on the key operation. If it is determined in step S90 that no key has been pressed, the process proceeds to step S58.

(Second Embodiment)

Figure 5:
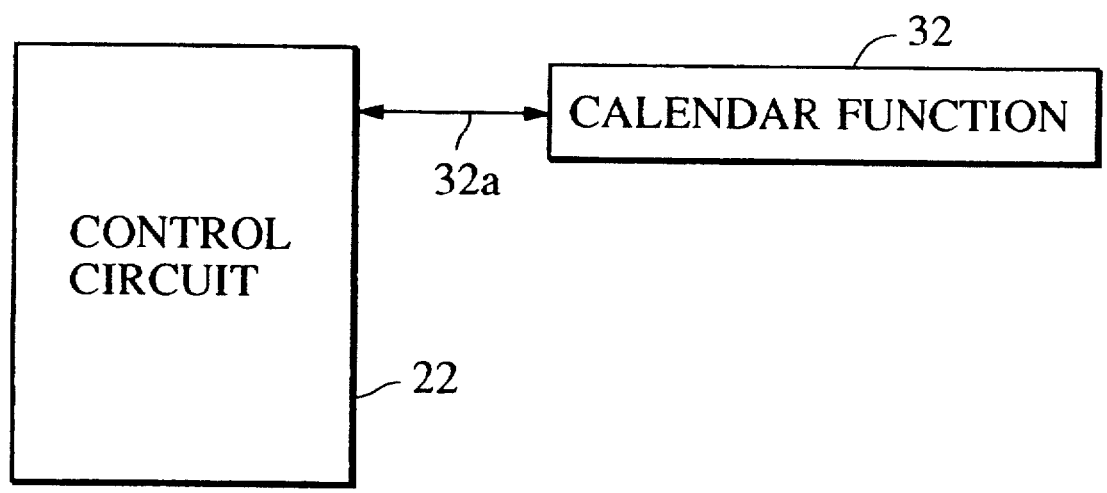
FIG. 5 is a block diagram of another embodiment of the facsimile apparatus in accordance with the present invention.
Figure 6:
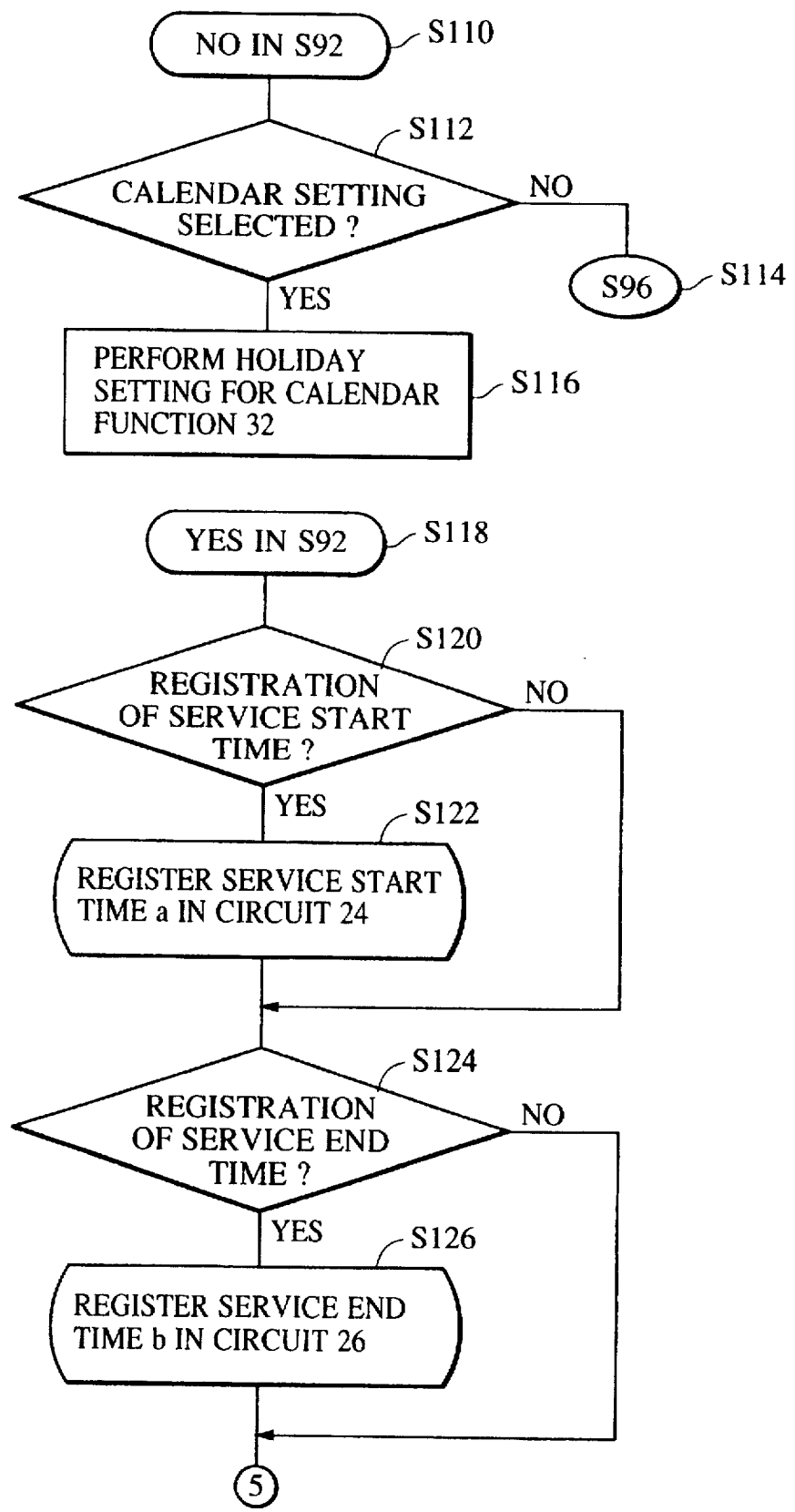
FIG. 6 is a flowchart of control of control circuit 22 shown in FIGS. 1 and 5.
Figure 7:
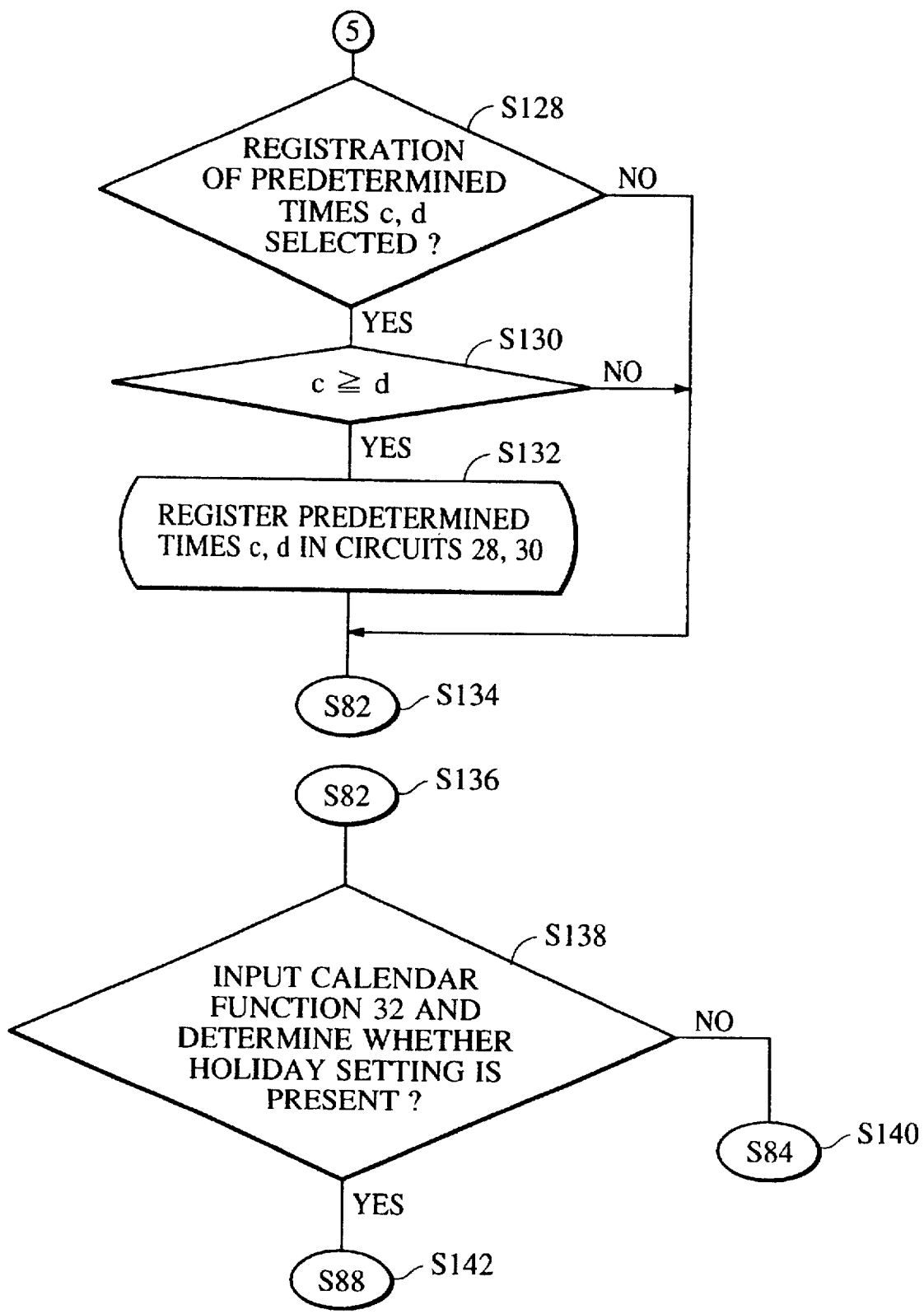
FIG. 7 is a flowchart of control of control circuit 22 shown in FIGS. 1 and 5.

The apparatus of the first embodiment may also has a calendar function such that holidays can be set, the period from time a to time b is set as service hours, and each of the above-mentioned predetermined time periods is set as a time period after the time b in holidays. The predetermined time period in the service hours is set so as to be longer than that in the time period other than the service hours FIGS. 6 and 7 show an example of control of this embodiment with respect to steps other than those shown in the flowcharts of FIGS. 2 to 4. FIG. 5 shows a block added to the block diagram of FIG. 1.

A block 32 in FIG. 5 represents a calendar function using a calendar and capable of setting holidays by operating section 10 through a signal line 32a.

Step 110 of FIG. 6 follows step S92 of FIG. 4 in the case of No of step S92.

In step S112, information on signal line 10a is input and determination is made as to whether setting of a holiday for the calendar function has been selected. If holiday setting has been selected, the process advances to step S116 to set a holiday in the circuit 32 through signal line 32a. If no holiday setting has been selected, the process proceeds to step S114 (S96 in FIG. 4).

Step 118 of FIG. 6 follows step S92 of FIG. 4 in the case of Yes of step S92.

In step S120, information on signal line 10a is input and determination is made as to whether registration of a service start time has been selected. If Yes, the process advances to step S122 to register a service start time a in the circuit 24. If No, the process proceeds to step S124.

In step S124, information on signal line 10a is input and determination is made as to whether registration of a service end time has been selected. If Yes, the process advances to step S122 to register a service end time b in the circuit 26. If No, the process proceeds to step S128.

In step S128, determination is made as to whether registration of predetermined times c and d has been selected. If Yes, the process advances to step S130 to make determination as to whether the predetermined time c is equal to or longer than the predetermined time d. If Yes, the process advances to step S132 to register the predetermined times c and d in the circuits 28 and 30, respectively. If No in step S130, the process proceeds to step S134 (S82 in FIG. 3). If registration of predetermined times c and d has not been selected in step S128, the process proceeds to step S134.

Step 136 of FIG. 7 corresponds to step S82 of FIG. 3.

In step S138, information on signal line 32a is input, that is, information of calendar function 32 is input, and determination is made as to whether a holiday function has been activated. If a holiday setting is present, the process advances to step S142 (S88 in FIG. 3) and a predetermined time period from the completion of an operation to a change from state B to state A is set as d. If no holiday setting is present, the process proceeds to step S140 (S84 in FIG. 3) and a predetermined time from the completion of an operation to a change from state B to state A is set in accordance with the present period.

(Third Embodiment)

In the first and second embodiments, three or more predetermined time periods each from the completion of one operation to a change from state B to state A may be set in correspondence with the periods separated by predetermined times instead of the above-mentioned two predetermined time periods selectively used.

(Fourth Embodiment)

Figure 8:
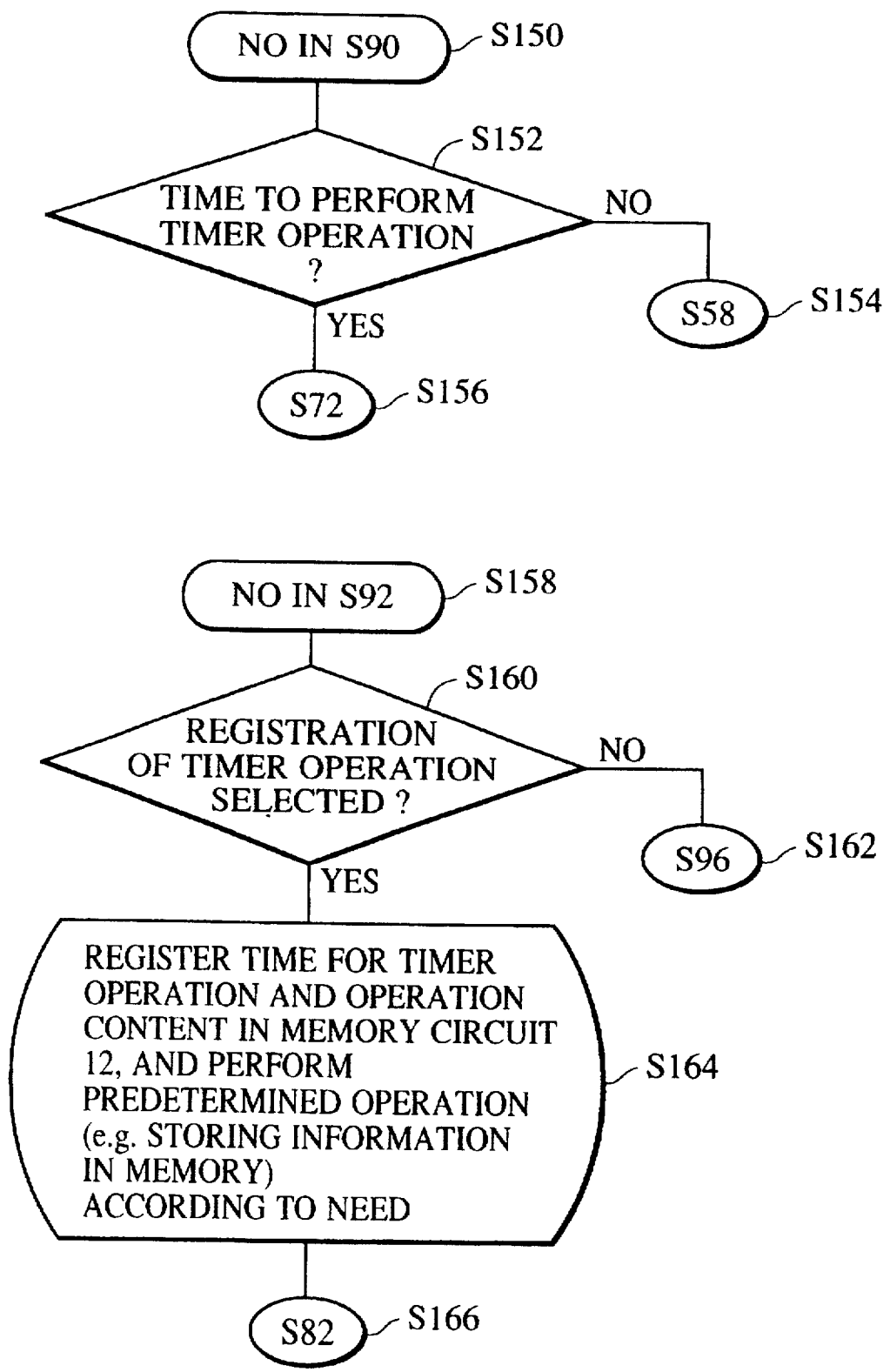
FIG. 8 is a flowchart of control of control circuit 22 shown in FIGS. 1 and 5.
Figure 9A:
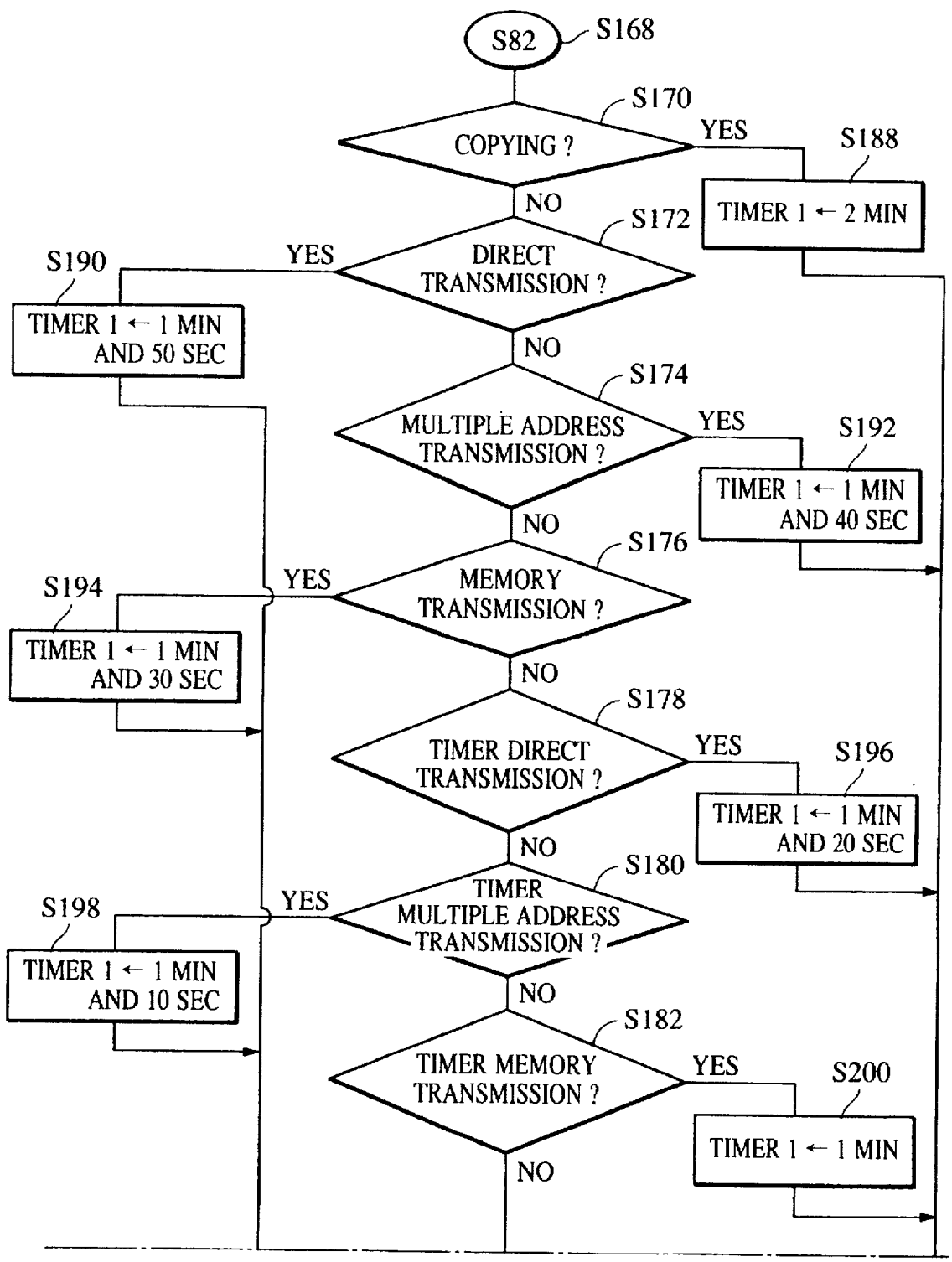

Each of the predetermined time periods from the completion of one operation to a change from state B to state A may be changed according to the kind of operation as well as days of the week and periods in one day. More specifically, the predetermined time period is reduced according to the kind of operation in the order of copying operation, direct transmission, multiple address transmission, memory transmission, timer direct transmission, timer multiple address transmission, timer memory transmission, direct reception and memory reception. FIGS. 8 and 9 show an example of this control with respect to steps other than those shown in the flowcharts of FIGS. 2 to 4.

Step 150 of FIG. 8 follows step S90 in the case of No of step S90.

In step S152, information in memory circuit 12 is input and determination is made as to whether the present time is a time for timer operation. At the time when timer operation is to be performed, the process advances to step S156 (S72 in FIG. 3). If the present time is not a time for timer operation, the process proceeds to step S154 (S58 in FIG. 2).

Step 158 of FIG. 8 follows step S92 of FIG. 4 in the case of No of step S90.

In step 160, information on signal line 10a is input and determination is made as to whether registration of timer operation has been selected. If Yes, the process advances to step S164 to register the time at which timer operation is started and the content of timer operation in the memory circuit 12. A predetermined operation (e.g., storing information in the memory) is performed if necessary.

Step S166 corresponds to step S82 of FIG. 3.

Referring to FIG. 9, step S168 corresponds to step S82 of FIG. 3.

In steps S170 to S186, the time period from the completion of one operation to a change from state B to state A (i.e., in which selection of another operation to be performed subsequently is checked) is changed according to the kind of the finished operation. In this example, this time period is increased if the number of persons who may operate the apparatus is larger, because the probability of performing another operation is higher. The frequency of ineffective changes from state B to state A and to state B is thereby reduced, so that the life of the apparatus is extended. If the number of persons who may operate the apparatus is smaller, the probability of subsequently performing another operation is lower. In such a situation, the above-mentioned predetermined time period is reduced for energy saving. More specifically, if copying is selected, 2 minutes are set in timer 1 (step S188). Similarly, if direct transmission, multiple address transmission, memory transmission, timer direct transmission, timer multiple address transmission, timer memory transmission, direct reception, memory reception and so on are subsequently selected, one minute and fifty seconds (S190), one minute and forty seconds (S192), one minute and thirty seconds (S194), one minute and twenty seconds (S196), one minute and ten seconds (S198), one minute (S200), fifty seconds (S202), forty seconds (S204) and thirty seconds (S206) are set successively and the process advances to step S208 (S58 of FIG. 2).

In this embodiment, the time period after multiple address transmission is longer than that after memory transmission. The reason for this time setting is because it can be generally supposed that multiple address transmission requires a longer time period in comparison with memory transmission. That is, it can be said that, if the time period taken to perform the preceding operation is longer, the waiting time for operators is longer, so that the probability of the next operation being performed successively is high.

(Fifth Embodiment)

The arrangement may be such that only one of predetermined voltages is used in state A to monitor conditions for various operations, and, if one operation is selected, a change to state B is effected to execute the operation. FIG. 10 shows blocks relating to the difference from the system shown in FIG. 1.

Referring to FIG. 10, the switching power source 18 of FIG. 1 is partially changed and the secondary battery 20 is removed. That is, +5 V S is directly output from the switching power source 18 to be applied between signal wires 18a and 18d instead of being output from the secondary battery. 5 V S is always output. Information on signal line 22a is input. When signal at level "0" is output, +5 V, +12 V and −12 V are not output. When signal at level "1" is output to signal line 22a, +5 V, +12 V and −12 V are output.

Figure 11:
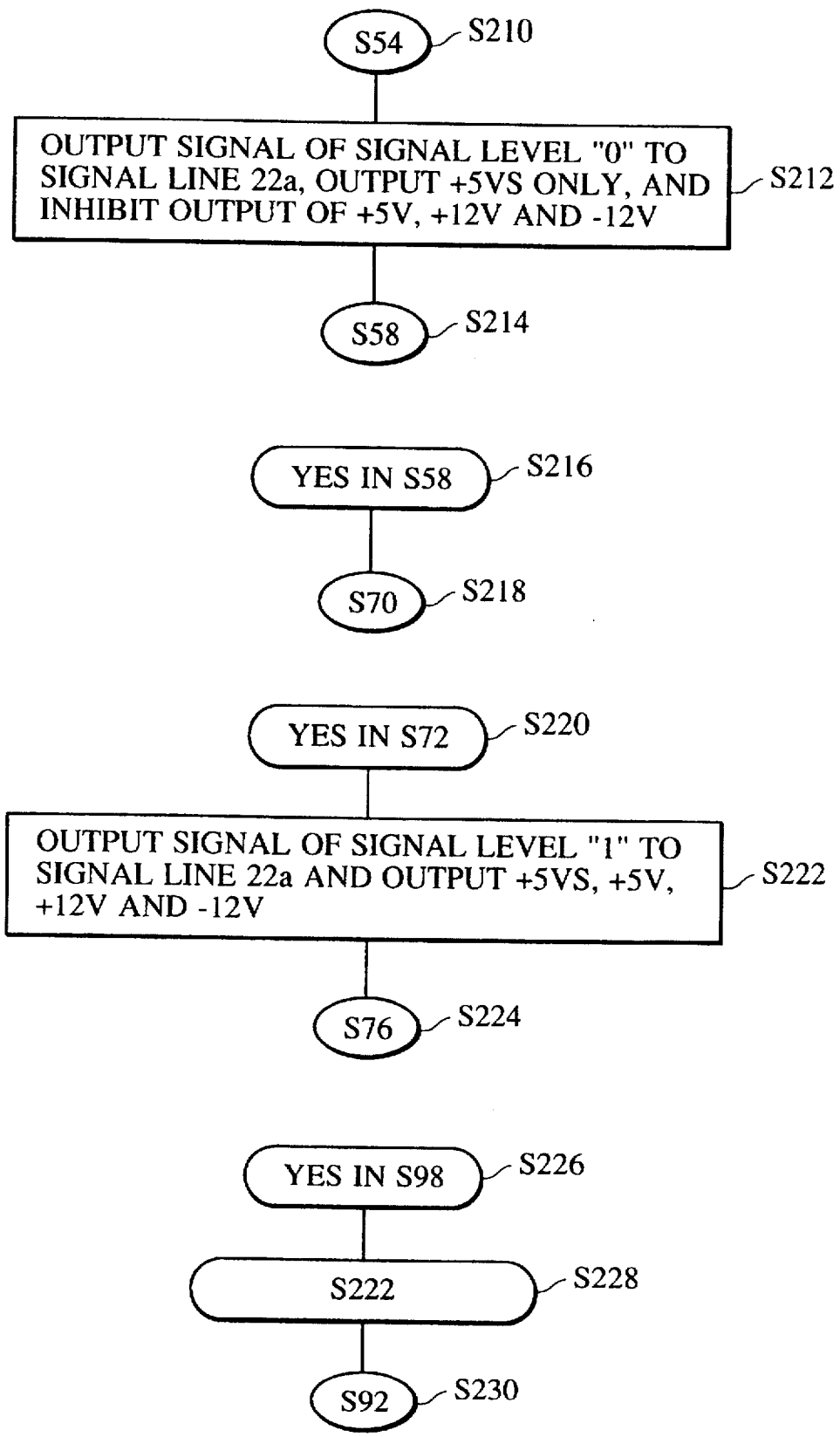
FIG. 11 is a flowchart of control of control circuit 22 shown in FIGS. 1, 5 and 10.

FIGS. 11 shows a flow chart of an example of this control with respect to steps other than those of the flowcharts of FIGS. 2 to 4.

Step S210 of FIG. 11 corresponds to step S54 of FIG. 2.

In Step S212, signal at level "0" is output to signal line 22a to output only 5 V S from the switching power source 18, while +5 V, +12 V and −12 V are not output. That is, the system is set in state A.

Step S214 corresponds to step S58 of FIG. 2.

Step S216 follows step S58 of FIG. 2 in the case of Yes of step S58. Since the secondary battery is not used, the process advances immediately to step S218 (S70 of FIG. 2).

Step S220 follows step S72 of FIG. 3 in the case of Yes of step S72.

In step S222, signal at level "1" is output to signal line 22a to output all of +5 V S, +5 V, +12 V and −12 V from switching power source 18 and to set the system in state B.

Step S224 corresponds to step S76 of FIG. 3.

Step S226 follows step S98 of FIG. 4 in the case of Yes of step S98. In step S228, the same control as in step S222 is executed to output all of +5 V S, +5 V, +12 V and −12 V. The process then advances to step S230 (S92 of FIG. 4).

As described above, according to the present invention, the predetermined time period from the completion of one operation to a change from state B to state A can be increased if the probability of an operator successively using the apparatus is high. The frequency of ineffective changes between state B and state A is thereby reduced, so that the life of the power source and, hence, the life of the facsimile apparatus can be extended, and an unnatural feeling of operation felt by users due to the change in state can be eliminated.

Also, according to the present invention, since the probability of using the facsimile machine is high in the daytime of weekdays, i.e., service hours, the time period between the time when one operation is completed and the time when the apparatus is thereafter set in the standby state is increased. In effective changes between sate A and B are thereby reduced, so that the life of the facsimile apparatus is extended and the facility with which users operate the apparatus is also improved. Conversely, in the period other than the service times, the probability of using the facsimile apparatus is low and the apparatus is therefore set in the standby state in a short time after the completion of one operation, thus achieving an improved energy saving effect.

Also, according to the present invention, the time period between the time when operation is completed and the time when the apparatus is thereafter set in the standby state is increased with respect to transmission, with which the probability of one or more users waiting for their turns is higher than with reception. (Also, the probability of users waiting is higher after manual operation than after automatic operation, after direct transmission than after memory/ multiple address transmission, after memory/multiple address transmission than after timer memory/timer multiple address transmission, or after long processing than after short processing.) Ineffective changes between states A and B are thereby reduced, so that the life of the facsimile apparatus is extended and the facility with which users operate the apparatus is also improved. Conversely, the probability of using the facsimile apparatus is lower after transmitting operation than after receiving operation. (Similarly, it is lower after automatic operation than after manual operation, after memory/multiple address transmission than after direct transmission, after timer memory/timer multiple address transmission than after memory/multiple address transmission, or after short processing than after long processing.) After the completion of such a low use-probability operation, the apparatus is set in the standby state in a short time to achieve an improved energy saving effect.

Further, according to the present invention, the above-mentioned predetermined time period after the completion of each of various kinds of operation to a change from state B to state A becomes definitely recognizable, so that the apparatus is easier to use.

Further, according to the present invention, state A (standby state) is definite in two cases, and the energy saving effect due to the standby state in either case is apparent.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structure and functions.

What is claimed is:

1. An apparatus having a state A in which an amount of AC power used is reduced and a state B in which AC power is used as desired, said apparatus comprising:

detection means for detecting a factor to start a control operation; and control means, responsive to the factor detected by said detection means, for changing from the state A to the state B to execute control on the basis of a control operation corresponding to the detected factor, said control means holding the state B if another factor is detected in a predetermined time period from the completion of the execution of control, and changing from the state B to the state A after the predetermined time period from the completion of the execution of control if another factor is not detected in the time period, said predetermined time period being changed according to time of day.

2. An apparatus according to claim 1, further comprising means for registering said predetermined time period in correspondence with the time of day wherein said control means compares a time when the control operation is finished with a stored time by said registering means, and changes the predetermined time period in accordance with a result of the comparison.

3. An apparatus according to claim 2, wherein said registering means registers a time period as said predetermined period after a time a and registers a time period as said predetermined time period after a time b.

4. An apparatus according to claim 3, further comprising a calendar function, said predetermined time period being set as a time period after the time b in holidays.

5. An apparatus according to claim 3, wherein the period between the time a and the time b is set as service hours.

6. An apparatus according to any one of claims 2 to 5, wherein said predetermined time period is changed so as to be longer in the service hours than in a period other than the service hours.

7. An apparatus according to claim 1, wherein, in the state A, only one voltage is supplied and the various operations are monitored, and wherein, when one of the various operations is selected, the state B is established in place of the state A to execute the operation.

8. An apparatus according to claim 1, further comprising a secondary battery, wherein the AC power supply is turned on in the state B to charge said secondary battery as well as to perform one of the various operations, and wherein, in the state A, conditions for starting the various operations are monitored by energy accumulated in said secondary battery.

9. A method of operating an apparatus having a state A in which the amount of AC power used is reduced and a state B in which AC power is used as desired, said apparatus comprising:

a detection step of detecting a factor to start a control operation; and a control step, responding to the factor detected by said detection step, for changing from the state A to the state B to execute control on the basis of a control operation corresponding to the detected factor, said control step holding the state B if another factor is detected in a predetermined time period from the completion of the execution of control, and changing from the state B to the state A after the predetermined time period from the completion of the execution of control if another factor is not detected in the time period, said predetermined time period being changed according to time of day.

10. A method of operating an apparatus according to claim 9, further comprising a first registering step of registering said predetermined time periods in correspondence with the time of day, wherein said control step compares a time when the control operation is finished with a stored time by said registering means, and changes the predetermined time period in accordance with a result of the comparison.

11. A method of operating an apparatus according to claim 10, wherein said registering step registers a time period as said predetermined after a time a and registers a time period as said predetermined time period after a time b.

12. A method of operating an apparatus according to claim 11, further comprising a calendar function, said predetermined time period being set as a time period after the time b is set as holidays.

13. A method of operating an apparatus according to claim 11, wherein the period between the time a and the time b is set as service hours.

14. A method of operating an apparatus according to any one of claims 10 to 13, wherein said predetermined time period is changed so as to be longer in the service hours than in a period other than the service hours.

15. A method of operating an apparatus according to claim 9, wherein, in the state A, only one voltage is supplied and the various operations are monitored, and wherein, when one of the various operation is selected, the state B is established in place of the state A to execute the operation.

16. Method of operating an apparatus according to claim 9, further comprising a secondary battery, wherein the AC power supply is turned on in the state B to charge said secondary battery as well as to perform one of the various operations, and wherein, in the state A, conditions for starting the various operations are monitored by energy accumulated in said secondary battery.

17. An apparatus having a state A in which the amount of AC power used is reduced and a state B in which AC power is used as desired, said apparatus comprising:

detection means for detecting a factor to start a control operation;

discrimination means for discriminating whether a predetermined condition is established with respect to the facsimile apparatus; and control means, responsive to the factor detected by said detection means, for changing from the state A to the state B to execute control on the basis of a control operation corresponding to the detected factor, said control means holding the state B if another factor is detected in a predetermined time period from the completion of the execution of control, and changing from the state B to the state A after the predetermined time period from the completion of the execution of control if another factor is not detected in the time period, said predetermined time period being changed according to a result of discrimination by said discrimination means, wherein when one operation is performed, said predetermined time period is increased if the time taken for the operation is longer.

18. A method of operating an apparatus having a state A in which the amount of AC power used is reduced and a state B in which AC power is used as desired, said apparatus comprising:

a detection step of detecting a factor to start a control operation;

a discrimination step of discriminating whether a predetermined condition is established with respect to the facsimile apparatus; and a control step, responding to the factor detected by said detection step, for changing from the state A to the state B to execute control on the basis of a control operation corresponding to the detected factor, said control step holding the state B if another factor is detected in a predetermined time period from the completion of the execution of control, and changing from the state B to the state A after the predetermined time period from the completion of the execution of control if another factor is not detected in the time period, said predetermined time period being changed according to a result of discrimination by said discrimination step, wherein, when one operation is performed, said predetermined time period is increased if the time taken for the operation is longer.

19. An apparatus having a state A in which an amount of AC power used is reduced and a state B in which AC power is used as desired, said apparatus comprising:

detection means for detecting a factor to start a control operation;

discrimination means for discriminating a type of the started control operation; and control means, responsive to the factor detected by said detection means, for changing from the state A to the state B to execute control on the basis of a control operation corresponding to the detected factor, said control means holding the state B if another factor is detected in a predetermined time period from the completion of the execution of control, and changing from the state B to the state A after the predetermined time period from the completion of the execution of control if another factor is not detected in the time period, said predetermined time period being changed according to a result of discrimination by said discrimination means.

20. An apparatus according to claim 19, wherein said predetermined time period is changed so as to be longer with respect to transmission than with respect to reception.

21. An apparatus according to claim 19, wherein said predetermined time period is changed so as to be longer with respect to manual operation than with respect to automatic operation.

22. An apparatus according to claim 21, wherein said predetermined time period is changed so as to be longer with respect to direct transmission than with respect to each of memory transmission and multiple address transmission.

23. An apparatus according to claim 21, wherein said predetermined time period is changed so as to be longer with respect to each of memory transmission and multiple address transmission than with respect to each of timer memory transmission and timer multiple address transmission.

24. A method of operating an apparatus having a state A in which an amount of AC power used is reduced and a state B in which AC power is used as desired, comprising:

a detection step of detecting a factor to start a control operation;

a discrimination step of discriminating a type of the started control operation; and a control step, responsive to the factor detected by said detection step, of changing from the state A to the state B to execute control on the basis of a control operation corresponding to the detected factor, said control step holding the state B if another factor is detected in a predetermined time period from the completion of the execution of control, and changing from the state B to the state A after the predetermined time period from the completion of the execution of control if another factor is not detected in the time period, said predetermined time period being changed according to a result of discrimination by said discrimination step.

25. A method of operating an apparatus according to claim 24, wherein said predetermined time period is changed so as to be longer with respect to transmission than with respect to reception.

26. A method of operating an apparatus according to claim 24, wherein said predetermined time period is changed so as to be longer with respect to manual operation than with respect to automatic operation.

27. A method of operating an apparatus according to claim 26, wherein said predetermined time period is changed so as to be longer with respect to direct transmission than with respect to each of memory transmission and multiple address transmission.

28. A method of operating an apparatus according to claim 26, wherein said predetermined time period is change so as to be longer with respect to each of memory transmission and multiple address transmission than with respect to each of timer memory transmission and timer multiple address transmission.

29. An apparatus according to claims 1, 17 and 19, wherein said apparatus is a facsimile apparatus.

30. A method according to claims 9, 18 and 24, wherein said apparatus is a facsimile apparatus.

31. An apparatus according to any one of claims 20 to 17, wherein said predetermined time is reduced in the order of copying, direct transmission, multiple address transmission, memory transmission, timer direct transmission, timer multiple address transmission, timer memory transmission, direct reception and memory reception.

32. A method of operating a facsimile apparatus according to any one of claims 25 to 18, wherein said predetermined time is reduced in the order of copying, direct transmission, multiple address transmission, memory transmission, timer direct transmission, timer multiple address transmission, timer memory transmission, direct reception and memory reception.

* * * * *

UNITED STATES PATENT AND TRADEMARK OFFICE
CERTIFICATE OF CORRECTION

PATENT NO. : 5,894,543
DATED : April 13, 1999
INVENTOR(S) : Takehiro Yoshida et al.

It is certified that error appears in the above-identified patent and that said Letters Patent is hereby corrected as shown below:

Column 1,
Line 25, "set" should read -- set to --.

Column 3,
Line 55, "staring" should read -- starting --.

Column 5,
Line 66, "has" should read -- have --.

Column 6,
Line 5, "hours" should read -- hours. --.

Column 7,
Line 36, "ofineffective" should read -- of ineffective --.

Column 8,
Line 15, "FIGS. 11" should read -- FIG. 11 --; and
Line 52, "sate" should read -- state --.

Column 10,
Line 43, "predetermined" should read -- predetermined time period --;
Line 59, "operation" should read -- operations --; and
Line 61, "Method" should read -- A method --.

Column 12,
Line 53, "change" should read -- changed --; and
Line 62, "20 to 17," should read -- 17 or 20 to 23, --.

UNITED STATES PATENT AND TRADEMARK OFFICE
CERTIFICATE OF CORRECTION

PATENT NO. : 5,894,543
DATED : April 13, 1999
INVENTOR(S) : Takehiro Yoshida et al.

It is certified that error appears in the above-identified patent and that said Letters Patent is hereby corrected as shown below:

<u>Column 13,</u>
Line 1, "a facsimile" should read -- an --; and
Line 2, "25 to 18," should read -- 18 or 25 to 28, --.

Signed and Sealed this

Twenty-fourth Day of February, 2004

JON W. DUDAS
*Acting Director of the United States Patent and Trademark Office*